United States Patent
Grynberg

(10) Patent No.: US 8,359,312 B2
(45) Date of Patent: Jan. 22, 2013

(54) METHODS FOR GENERATING A PERSONALIZED LIST OF DOCUMENTS ASSOCIATED WITH A SEARCH QUERY

(76) Inventor: Amiram Grynberg, Neve Efrayim Monoson (IL)

( * ) Notice: Subject to any disclaimer, the term of this patent is extended or adjusted under 35 U.S.C. 154(b) by 453 days.

(21) Appl. No.: 12/404,354

(22) Filed: Mar. 16, 2009

(65) Prior Publication Data

US 2009/0248677 A1 Oct. 1, 2009

Related U.S. Application Data

(60) Provisional application No. 61/039,439, filed on Mar. 26, 2008.

(51) Int. Cl.
*G06F 7/00* (2006.01)
*G06F 17/30* (2006.01)
(52) U.S. Cl. ........................................... 707/732
(58) Field of Classification Search .................... 707/732
See application file for complete search history.

(56) References Cited

U.S. PATENT DOCUMENTS

| | | | |
|---|---|---|---|
| 7,260,573 B1 * | 8/2007 | Jeh et al. .................. | 707/708 |
| 7,827,170 B1 * | 11/2010 | Horling et al. ............. | 707/722 |
| 2004/0049494 A1 * | 3/2004 | Kottisa .................... | 707/3 |
| 2005/0071328 A1 * | 3/2005 | Lawrence ................. | 707/3 |
| 2005/0102282 A1 * | 5/2005 | Linden .................... | 707/3 |
| 2005/0131866 A1 * | 6/2005 | Badros et al. ............. | 707/3 |
| 2005/0222981 A1 * | 10/2005 | Lawrence et al. .......... | 707/3 |
| 2006/0129533 A1 * | 6/2006 | Purvis .................... | 707/3 |
| 2006/0248059 A1 * | 11/2006 | Chi et al. ................. | 707/3 |
| 2006/0294086 A1 * | 12/2006 | Rose et al. ............... | 707/3 |
| 2007/0156677 A1 * | 7/2007 | Szabo .................... | 707/5 |
| 2007/0203887 A1 * | 8/2007 | Dynin .................... | 707/3 |
| 2007/0276801 A1 * | 11/2007 | Lawrence et al. ........... | 707/3 |
| 2009/0094224 A1 * | 4/2009 | Ricket et al. ............. | 707/5 |
| 2009/0100015 A1 * | 4/2009 | Golan .................... | 707/3 |

* cited by examiner

*Primary Examiner* — Robert Beausoliel, Jr.
*Assistant Examiner* — Michael Pham

(57) ABSTRACT

A method for generating, by a monitoring program, a list of relevant documents, related to a search query, comprising tracking activities of first user pursuant to retrieval of a first list of primary documents resulting from a first search query; assigning a user interest score to a secondary document whose identifier is referenced within the contents of a primary or another secondary document; adding said identifier and score to a list of relevant documents wherein said list is associated with said first query and said first user; persisting said list of relevant documents to store.

17 Claims, No Drawings

METHODS FOR GENERATING A PERSONALIZED LIST OF DOCUMENTS ASSOCIATED WITH A SEARCH QUERY

CROSS REFERENCE TO RELATED APPLICATIONS

Provisional Application Ser. No. 61/039,439 filed Mar. 26, 2008, the benefit of which is hereby claimed under 35 U.S.C. .sctn. 119 (e), and wherein said provisional application is further incorporated herein by reference.

BACKGROUND OF THE INVENTION

When users look for information, using search engines, they get a list of what seems relevant to the search engine.

However, the choice of a search query used for executing a search, by an individual user, is not necessarily the same as the search query choice of another user, even though both are trying to find the same information. Thus, in most cases, a user ends up with a list of primary search results, which he or she then uses as a base for reaching relevant documents.

The final set of relevant documents may contain documents which are not included in the search results. This happens when a user reads a first (primary) document and then opens a secondary document from links found in the primary document.

This process can continue for a long time wherein more documents are opened from links found in previously opened documents. Some documents are kept open or saved while others are closed as they are found to be not relevant.

The issue is, that when a user executes the same (or very similar) search query again, at a later time, said user will have to go through the same tedious research process once more, trying to generate the same list.

One solution is for users to organize search results manually, creating a list of documents relevant to a particular topic and ordering them according to their relevancy. However, many times, such investment in time does not seem relevant when first executing the search. Only when the same information is needed again in a later time, does a user regret not making the effort.

Patent application publication 20070088692 discloses several methods for making search results more relevant to a user or a group of users. However, such methods only apply to documents listed in the primary search results. They do not deal with the end result—being the list of documents a user has built, pursuant to receiving the ones listed in the search results.

Thus, it would be beneficial if users had the option of automatically retrieving the list of documents they themselves found relevant when they executed a similar search in the past. Further, it would be advantageous if classifying a set of documents as relevant is performed automatically by software monitoring behavior of said users.

SUMMARY OF THE INVENTION

The present invention describes methods for producing a personalized list of relevant documents the search for which starts with a search query.

In accordance with a preferred embodiment of the present invention, a software program monitors actions carried out by a user after said user receives a list of primary documents as search results. Pursuant to such monitoring, said software program then generates and stores a list of relevant documents related to the original search query. Future queries using similar search terms would return the list of relevant documents in lieu of the original search results.

BRIEF DESCRIPTIONS OF THE DRAWINGS no drawings

DETAILS OF THE INVENTION

Search systems deal with documents. A document can be local or remote. Search results are typically returned by search engines which try to generate the most relevant ordered list of documents to a particular search query.

Patent application publication 20070088692 deals extensively with methods to enhance the relevancy of search results whether personalized per user or per an aggregate of users.

However, such enhancement as other enhancement suggested by others, deal only with ranking of documents matching a particular search criteria. First, a document is determined to match a search query (i.e. containing the search terms or equivalent terms). Then, a document relative order in the returned search results is determined based on a relevancy score.

Many times, a document, one is looking for, might not match the search query. This happens if the query is not well formulated, or the author of such document elected to use other terms to describe the topic a user is researching.

Users, researching a particular topic, formulate a search query, which usually is their way of understanding the topic they search for. They then spend a lot of time browsing the list of search results trying to determine a set of relevant documents. Such browsing is not limited to documents included in the search results ("primary documents").

A typical user would open several primary documents and then open other documents ("secondary documents") a reference to which they find within the contents of said primary documents.

Each opened document in turn, be it primary or secondary, may serve as a source for identifying other documents ("secondary documents"). This process can go on until a satisfactory set of documents is reached.

When users post a similar query at a later time, they are faced again with the need to go through such a research to produce the set of relevant documents.

This problem is solved by adding a monitoring program, implementing the methods disclosed in the present invention and executing on a computing device, through which a user conducts searches for documents.

The monitoring program monitors user's activities carried out on documents and it generates a list of relevant documents from such monitoring.

Further, when a user posts a search query, the monitoring program can intervene and suggest to that user to view the list of relevant documents it has generated in the past.

In accordance with a preferred embodiment of the present invention, the monitoring program is added as an extension of a web browser. However, it can be implemented by other means, known to those skilled in the art of programming, when there is a need to monitor documents which are not web based.

Thus, in accordance with a preferred embodiment, a monitoring program detects a search query submitted by a user to a search engine and the resulting search results returned from that engine. We will use the term "primary search results" to refer to such results.

We will use the term "primary document" to refer to a document listed in the primary search results. The term "document identifier" is used to specify the location of that document. This can be, for example, a URL, a file path, or other identifier through which a document can be retrieved.

When a user clicks on a link in the primary search results, a primary document opens. A document may be a web page or other document type.

Once a primary document opens; a user may read the contents of such document and use said content to determine that she wants to open another document a reference to which she found in the contents. We will use the term "secondary document" to refer to a document a user opens NOT from links in the primary search results.

Once a secondary document opens, a user may open a second secondary document by finding references to such document within the first secondary document. This can go on, creating a chain of open documents wherein one document references another.

The term 'reference' is used here in a broad sense. A document is referenced if there is a link to that document.

A document is also referenced if a document identifier or a partial identifier is mentioned and the user uses that identifier to retrieve the document. Again, 'using' may take several forms. The simplest being copying the identifier from the document and pasting the identifier into a document browser. Alternatively, pasting the document identifier or parts thereof in a search query to create a list of matching documents.

Thus, a monitoring program detects 'using' cases and correlates the identifier used with an identifier contained in the contents of an open document.

For example, if the word 'bible' is included in a first document and a user enters that word to a search engine, pursuant to reading said first document, the monitoring program can assume that documents returned from the search query 'bible' are relevant to the first document with some degree of certainty. Search results for said term are not considered "primary search results" any more.

Determining that a document is one of interest to a user, is based on measuring user interactions with said document.

Such interactions may include, but not limited to, opening, closing, deleting, reading, saving, forwarding, copying, adding to favorites list, citing the document etc. We define a "current document" as a document with which a user is currently interacting.

Each such interaction may be assigned a partial score and a weight. A final score for a document is calculated by joining all interactions with their normalized measure and weight.

Further, a score of a document can be continually adjusted as the user may interact with that document more than once during a session or across several search sessions.

It is important to note, that the score given to a particular document is not assigned to the document. It is assigned to the 'query-user-document' triplet. This again is different from methods claimed by others where a score of a document is for that document or for the 'document-user' combination.

While most interactions are easy to measure, reading a document may not. To detect when a user reads a document, one should combine several measures.

An open document is not necessarily one that a user reads or interacts with. An open document may not be visible to a user, if other documents cover it or if another application hides it. Further, a document may be open in a computing device, but the session within which said document was opened may not be active.

Thus, one preferred method for determining whether a user is reading a document is to determine that it is the last current document, open, visible and it is displayed in the top most window. Further, the significance of such measurement can be increased if the user interacts with the document every now and then (like in the case of scrolling).

The measure of time a user is reading a document may not provide a reliable score. Short documents may be very relevant, yet the reading time may be short. So, as a normalization step, reading time should be adjusted to the size of the document, to obtain a fair measure of relative reading time.

One more measure related to time is determining the amount of time a document remains open (and not closed by a user) after it had been first read by that user.

Other actions that may be incorporated include printing and forwarding a document. Such an action by a user is a strong signal for the document being relevant. Adding a document to a list of favorites or saving it to disk are strong indicators as well.

Further, copying parts of a document, or citing a document when creating a manual list, are also good indicators.

As the monitoring program detects documents that the user interacts with, it builds a list of such relevant documents. Each document identifier to be included in that list is stored with at least its score. Other variables such as date-time of measurement may be included to facilitate long term adjustments.

The list is preferably ordered so that documents with higher score show up first. As a user interacts with a document, the monitoring program may update its score and thus its relative position in the generated list.

Each generated list starts with a primary search query. Thus, the search query that started that list is associated with the list.

A generated list is persisted to storage so that it can be displayed to a user when a new query, similar to the query that generated the list is detected.

When the monitoring program detects a new query, it scans its database of generated lists of relevant documents. If it finds a list with an associated search query, substantially similar to the new query, it retrieves the list of relevant documents and presents it to the user.

The term 'substantially similar' means that the new query is made of terms which are the same or contextually equivalent to the original query. Yet, alternate method to determine similarity, is to compare the list of top primary documents returned by a new query to the list of top primary documents used to create the original list.

Further, the a program can automatically open some or all documents listed in the list of relevant documents, thus restoring a user to the same environment of open documents she had when the list was generated.

Alternatively, a monitoring program can save the list of relevant documents to the user's list of 'favorite documents' or any other folder, allowing access to the list without a need for a second query.

When saving a list of relevant documents, a user can be allowed to determine the number of top scoring documents to be saved in the list.

What is claimed is:

1. A method for generating, by a monitoring program, a list of relevant documents, related to a first search query, comprising:

tracking activities of a first user pursuant to retrieval of a first list of primary documents resulting from the first search query;

monitoring a secondary document the first user interacts with, the secondary document whose identifier is referenced within the contents of a primary document or another secondary document;

assigning a user interest score to the secondary document whose identifier is referenced within the contents of a primary document or another secondary document, and wherein the user interest score is based on measuring user interactions with the secondary document;

adding the identifier of each such secondary document whose identifier is referenced within the contents of a primary document or another secondary document and the user interest score of each such secondary document, whose identifier is referenced within the contents of a primary or another secondary document, to a new list of relevant documents;

persisting said new list of relevant documents to storage in a manner so that each such persisted said new list, submitted by said first user, is only accessible to said first user and is associated with said first search query;

returning said persisted said new list of relevant documents as said list of relevant documents, in response to a second query, by said first user, if and only if, said second query matches said associated first query.

2. The method of claim 1 further including, automatically opening one or more documents included in said list of relevant documents returned.

3. The method of claim 1 further including the step of assigning a user interest score to a primary document and adding an identifier of the primary document and the user interest score of the primary document to said list of relevant documents.

4. The method of claim 1, further excluding from the list of relevant documents, those documents whose said user interest score does not meet a specified criteria.

5. The method of claim 1, further including ordering the relevant documents of the list of relevant documents returned by the user interest score of each the relevant documents.

6. The method of claim 1 wherein the user interest score in the secondary document is based on cumulative actions taken by said first user each time said first user handles said secondary document pursuant to substantially a similar query.

7. The method of claim 1 wherein the user interest score in the secondary document is also derived from a measure of the time said first user spends reading said secondary document.

8. The method of claim 7 wherein the measure of time said first user spends reading the secondary document is calculated from periods when the contents of said secondary document are visible in the foreground window during an active session.

9. The method of claim 7 wherein said measure of time said first user spends reading the secondary document is normalized relative to the size of said secondary document.

10. The method of claim 7 wherein the user interest score in the secondary document is also derived from a measure of the time said secondary document remains open after being first read by said first user.

11. The method of claim 1 wherein the user interest score in the secondary document is also derived from said first user action of copying all or parts said document.

12. The method of claim 1 wherein the user interest score in the secondary document is also derived from said first user action of printing said secondary document.

13. The method of claim 1 wherein the user interest score in the secondary document is also derived from said first user action of forwarding said secondary document.

14. The method of claim 1 wherein the user interest score in the secondary document is also derived from said first user action of saving said secondary document.

15. The method of claim 1 wherein the user interest score in the secondary document is also derived from said first user action of citing the identifier of said secondary document.

16. The method of claim 1 wherein the user interest score in the secondary document is also derived from said first user action of adding the secondary document to a list of documents.

17. The method of claim 1 further including:
monitoring said first user interactions with primary documents of the list of primary documents;
assigning a user interest score to each said primary document of the primary documents of the list of primary documents the user interacts with, wherein each user interest score of the user interest scores assigned to said each primary document of the primary documents of the list of primary documents the user interacts with, wherein the assigning said user interest score to said each primary document of the primary documents is based on measuring user interactions with said each primary document;
adding an identifier of each said primary document of the primary documents of the list of primary documents the user interacts with and the user interest score of each said primary document of the primary documents of the list of primary documents the user interacts with to said new list of relevant documents, before said new list is persisted to storage.

* * * * *